United States Patent
Guillaume

(10) Patent No.: US 9,188,690 B2
(45) Date of Patent: Nov. 17, 2015

(54) NON-LINEAR TOMOGRAPHY METHOD FOR MAIN AXIS OF SYMMETRY OF ANISOTROPIC VELOCITY MODEL AND APPARATUS

(75) Inventor: Patrice Guillaume, Orsay (FR)

(73) Assignee: CGGVERITAS SERVICES SA, Massy Cedex (FR)

( * ) Notice: Subject to any disclaimer, the term of this patent is extended or adjusted under 35 U.S.C. 154(b) by 784 days.

(21) Appl. No.: 13/482,171

(22) Filed: May 29, 2012

(65) Prior Publication Data

US 2012/0307593 A1 Dec. 6, 2012

(30) Foreign Application Priority Data

May 30, 2011 (FR) ...................................... 11 54700

(51) Int. Cl.
*G01V 1/00* (2006.01)
*G01V 1/30* (2006.01)

(52) U.S. Cl.
CPC .. *G01V 1/30* (2013.01); *G01V 1/301* (2013.01)

(58) Field of Classification Search
CPC ........... G01V 1/30; G01V 1/28; G01V 1/307; G01V 1/301; G01V 2210/51
USPC ..................................................... 367/50, 38
See application file for complete search history.

(56) References Cited

U.S. PATENT DOCUMENTS

| 5,508,973 | A | 4/1996 | Mallick et al. |
| 6,577,955 | B2 | 6/2003 | Guillaume |
| 7,663,972 | B2 * | 2/2010 | Martinez et al. ................ 367/52 |
| 8,417,497 | B2 * | 4/2013 | Osypov et al. .................. 703/10 |
| 2008/0165619 | A1 | 7/2008 | Bachrach et al. |
| 2010/0135115 | A1 | 6/2010 | Sun et al. |
| 2011/0085413 | A1 | 4/2011 | Keers et al. |
| 2013/0242699 | A1 * | 9/2013 | Lambare et al. ................ 367/53 |

FOREIGN PATENT DOCUMENTS

FR 2648562 A1 12/1990

OTHER PUBLICATIONS

Leon Thomsen, "Weal Elastic Anisotropy" Geophysics vol. 51., No. 10, Oct. 1986, pp. 1954-1966.
V. Singh et al., "Travel Time Approximation in Anisotropic Layered Media", Geohorizons vol. 6, No. 1 Jan. 2001.
Andrey Bakulin et al., "Building Titled Transversely Isotropic Depth Models Using Localized Anisotropic Tomography With Well Information" Geophysics vol. 75., No. 4, Jul.-Aug. 2010, pp. D27-D36.
Vladimir Grechka et al., "Velocity Analysis for Tilted Transversely Isotropic Media: A Physical Modeling Example", Geophysics vol. 66., No. 3, May-Jun. 2001, pp. 904-910.
Search Report issued in corresponding Great Britain Patent Application No. GB1209561.8 dated Sep. 28, 2012.

(Continued)

*Primary Examiner* — Mark Hellner
(74) *Attorney, Agent, or Firm* — Patent Portfolio Builders PLLC

(57) ABSTRACT

Device and method for estimating an event-related main anisotropy axis for a volume in a subsurface. The method includes selecting a velocity migration model for the given volume of the subsurface; receiving seismic data for the given volume; migrating the seismic data based on the velocity migration model; picking locally coherent events from the migrated data; and performing a tomographic process based on invariants to calculate the event-related main anisotropy axis.

21 Claims, 13 Drawing Sheets

(56) References Cited

OTHER PUBLICATIONS

French Preliminary Search Report in corresponding French Patent Application No. 1154700 dated Apr. 13, 2012.
S. Wolfarth, et al.; "Deriving a Depth Velocity Model Using Time Migrated Data—Case Study"; EAGE 69th Conference & Exhibition; vol. 6; XP8150456; Jun. 11-14, 2007; pp. 3655-3659; London, U.K.
S. Zimine, et al.; "Can We Correct for Azimuthal Variations of Residual Moveout in Land WAZ Context Using Depth Non-linear Slope Tomography?"; 72nd EAGE Conference & Exhibition, vol. 1; XP8150455; Jun. 14-17, 2010; pp. 312-316; Barcelona, Spain.
Bin Wang, et al.; "A 3D subsalt tomography based on wave-equation migration-perturbation scans"; Geophysics Society of Geophysicists; vol. 71, No. 2; XP001241071; Mar. 1, 2006; pp. E01-E06; Cedex, France.

* cited by examiner

NON-LINEAR TOMOGRAPHY METHOD FOR MAIN AXIS OF SYMMETRY OF ANISOTROPIC VELOCITY MODEL AND APPARATUS

BACKGROUND

1 Technical Field

Embodiments of the subject matter disclosed herein generally relate to methods and systems and, more particularly, to mechanisms and techniques for determining a main axis of symmetry for an anisotropic velocity model.

2 Discussion of the Background

During the past years, the interest in developing new oil and gas production fields has dramatically increased. However, the drilling is an expensive process. Thus, those undertaking the drilling need to know where to drill in order to avoid a dry well.

Seismic data acquisition and processing generate a profile (image) of the geophysical structure under the seafloor or subsoil. While this profile does not provide an accurate location for the oil and gas, it suggests, to those trained in the field, the presence or absence of oil and/or gas. Thus, providing a high resolution image of the structures under the seafloor/subsoil is an ongoing process.

To construct images of the subsoil (or subsurface), geologists or geophysicists conventionally use wave emitters (sources) placed on the surface, for example. For the case of marine seismic, the wave emitters are towed by a vessel at or under the surface of the water. Such emitters emit waves which propagate through the subsoil (and water for the marine seismic) and which are reflected on the surfaces of the various layers thereof (reflectors). Waves reflected to the surface are recorded as a function of time by receivers (which are towed by the same vessel or another vessel for the marine seismic or lay on ocean bottom). The signals received by the receivers are known as seismic traces.

It is conventional to pick portions of such seismic traces which correspond to reflections of pulses emitted from the surface, and which correspond to reflectors of interest, and also to determine the travel times that correspond to such reflections. Tomography inversion techniques consist in modeling velocity fields within the subsoil as a function of the acquired seismic traces and of selected events.

Tomography is commonly used in depth imaging of seismic data for estimating wave propagation velocity (P-waves, S-waves) and anisotropic parameters (epsilon, delta, sigma, see for example, Thomsen, L. A., 1986, Weak elastic anisotropy, Geophysiscs, Vol. 51, No. 10, October, P. 1954-1966, the entire content of which is incorporated herein by reference). The tomography can be ray-based or wave equation-based, it can invert surface seismic data or Vertical Seismic Profile (VSP) (also called borehole seismics) data, it can estimate one or more velocity parameters.

In conventional imaging processing, the main direction of anisotropy of the subsurface is often assumed to be equal to the structural dip that follows the geology of the subsurface; when referring to transverse isotropy, this case is often referred to as Structural Transverse Isotropy (STI). In this regard, FIG. 1 shows a portion of the subsoil 10 having various layers 12, 14, 16. The tilt axis 18 for a portion 20 of the layer 12 is perpendicular (for most cases) to the surface of the portion 20. The tilt axis is picked from a seismic migrated cube usually obtained by depth migration in an isotropic or Vertical Transverse Isotropy (VTI) or STI or Tilted Transverse Isotropy (TTI) model. The picked tilt axis is usually inserted into the velocity model to describe its main symmetry axis. This will affect wave propagation in this velocity model. The post-stack or pre-stack depth migration of seismic data in the updated model produces a new migrated seismic image, slightly different from the original seismic image. Thus, the tilt axis model does not match any longer a re-migrated structure. Existing techniques are unable to produce a tilt axis model that matches the migrated image, except by re-iterating several times a loop shown in FIG. 2. FIG. 2 shows such a loop that starts at step 30 with a migration model. Based on this model, the seismic data is migrated in step 32 and in step 34 a dip is picked. In step 36 a STI tilt is computed and in step 38 the migration model is updated based on this data. This process (loop) illustrated in FIG. 2 is computer intensive as the migration and dip picking are repeatedly calculated. Further, this process may not fully converge.

TTI velocity is commonly considered nowadays in seismic depth imaging. STI is the most popular instantiation of TTI velocity where the tilt axis follows the geological structures. In all that follows, STI-related tilt axis means a tilt axis that can be computed partly from a structural (geological) dip, where the dip is a line perpendicular to a facet of the geological structure. In a typical situation, the geophysicist picks STI-related axis on migrated images created by migrating seismic data in an anisotropic model that contains an initial guess for the STI axis. To obtain a more precise image, the geophysicist then integrates the picked STI-related tilt axis into the anisotropic velocity model and re-migrates the seismic data because the modified anisotropy model impacts the wave propagation and thus, the migration/positioning of the migrated seismic data. This process can be repeated several times to obtain a satisfactory anisotropic velocity model as illustrated in FIG. 2. However, as noted above, this process is computer intensive, as the migration and dip picking have to be performed each time the model is updated.

Accordingly, it would be desirable to provide systems and methods that avoid the afore-described problems and drawbacks.

SUMMARY

According to one exemplary embodiment, there is a method for estimating event-related main anisotropy axis for a volume in a subsurface. The method includes selecting a velocity migration model for the given volume of the subsurface; receiving seismic data for the given volume; migrating the seismic data based on the velocity migration model; picking locally coherent events from the migrated data; and performing a tomographic process based on invariants to calculate the event-related main anisotropy axis.

According to another exemplary embodiment, there is an interface implemented in a computer system for estimating event-related transverse isotropy axis for a volume in a subsurface. The interface is configured to execute the following steps: selecting a velocity migration model for the given volume of the subsurface; receiving seismic data for the given volume; migrating the seismic data based on the velocity migration model; picking locally coherent events from the migrated data; and performing a tomographic process based on invariants to calculate the event-related main anisotropy axis.

According to still another exemplary embodiment, there is a computer system configured to estimate an event-related main anisotropy axis for a volume in a subsurface. The computer system includes an interface configured to receive and output data; and a processor connected to the interface. The processor is configured to select a velocity migration model for the given volume of the subsurface, receive seismic data for the given volume, migrate the seismic data based on the velocity migration model, pick locally coherent events from the migrated data, and perform a tomographic process based on invariants to calculate the event-related main anisotropy axis.

According to yet another exemplary embodiment, there is a computer readable medium including computer executable instructions, wherein the instructions, when executed, implement a method for estimating an event-related main anisotropy axis for a volume in a subsurface, the method including the steps noted above.

According to still another exemplary embodiment, there is a method for estimating event-related main anisotropy axis for a volume in a subsurface. The method includes receiving at a processor seismic data for the given volume; picking invariants from the seismic data, wherein the seismic data is not migrated; and performing a tomographic process based on the invariants to calculate the event-related main anisotropy axis.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of STI-related tilt axis. However, the embodiments to be discussed next are not limited to an STI model, but may be applied to other models, e.g., TTI, VTI, etc. Further, in the following, an event related main anisotropy axis of symmetry is used and this axis could be, for example, the STI-related tilt axis. However, the event related tilt axis is broader and includes other tilt axes depending on the model used.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Determining the seismic image of the subsoil without taking into consideration the anisotropy of the subsoil does not produce accurate details of the subsoil. According to an exemplary embodiment, an accurate main anisotropy symmetry axis is defined for the subsoil. The main symmetry axis is determined by solving an inverse problem because the main symmetry axis depends on the migrated image which depends on the migration anisotropic model which in turn depends on the main symmetry axis. By using an inverse technique, when the main anisotropy symmetry axis is related by some predefined algorithm (e.g., gravity, geomechanics . . . ) to the geological structure, the anisotropy main symmetry axis is determined in a one pass inverse method. This means that in contrast to the traditional method illustrated in FIG. 2, the steps of migration and dip picking are not repeated multiple times. In one application, these two steps are performed only once according to an exemplary embodiment. According to another application, these two steps are repeated a couple of times, much less than the number used in the traditional methods.

Figure 3:
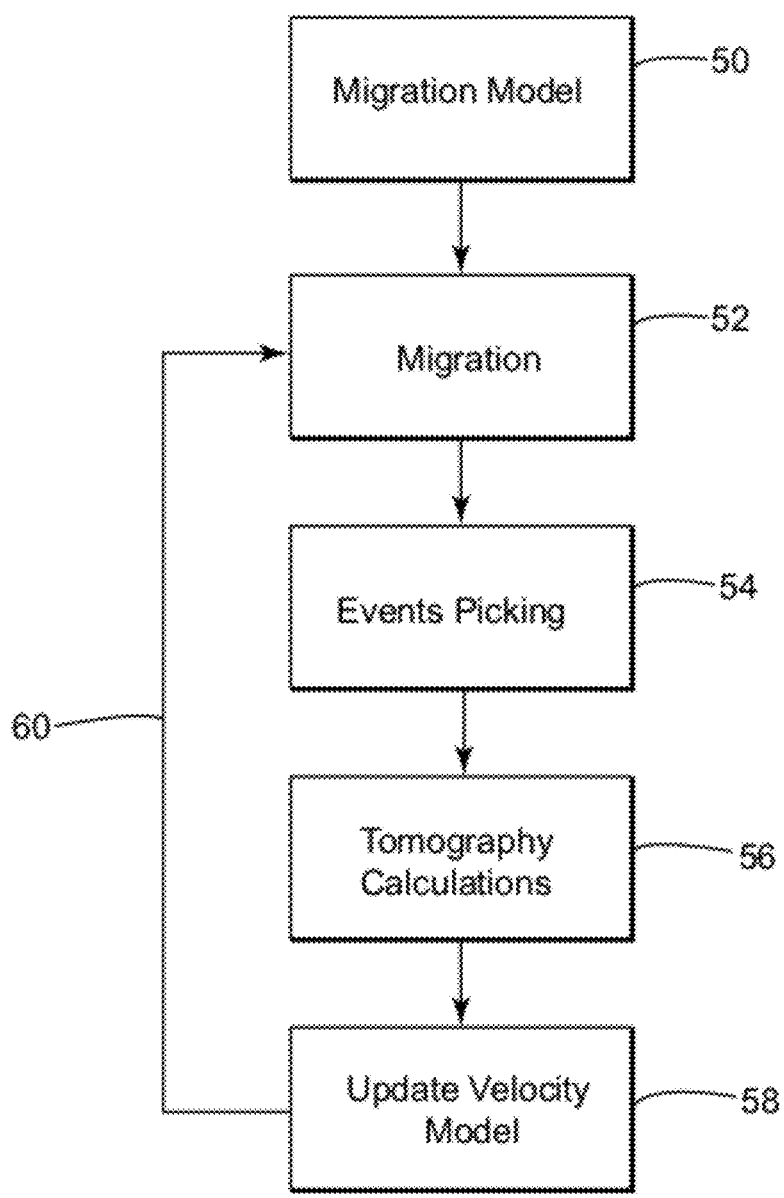
FIG. 3 is a flowchart of a method for calculating an event related main anisotropy axis of symmetry of a subsurface according to an exemplary embodiment.

As shown in FIG. 3, a novel method for estimating an event related anisotropy main axis of symmetry (axis of symmetry from now on) includes a step 50 of selecting a velocity model followed by a step 52 of migrating seismic data based on the selected velocity model. In step 54, locally coherent events are picked based on known methods. Events are said to be locally coherent when small portions of the seismic reflectors (called facets) are observed based on a sufficient amount of seismic traces to correlate with the geology of the subsoil where the facet is located. In step 56, tomography calculations (to be discussed in more details later) are applied for determining an update of the velocity model. The tomography calculations include a tomographic inversion that perturbs an initial event-related tilt axis till a discrepancy between a tilt direction inferred from the migrated event and a direction of the event-related tilt axis at the position of the migrated event is globally minimized. As invariants are used, the initial event-related tilt axis needs not be close to the solution tilt axis and may simply be, for example, the VTI case. The problem to solve in this step is non-linear and ill-posed, hence a non-linear tomography method to solve is used as discussed later. Finally, in step 58, the anisotropic velocity model is updated based on the estimated event-related tilt axis.

Figure 1:
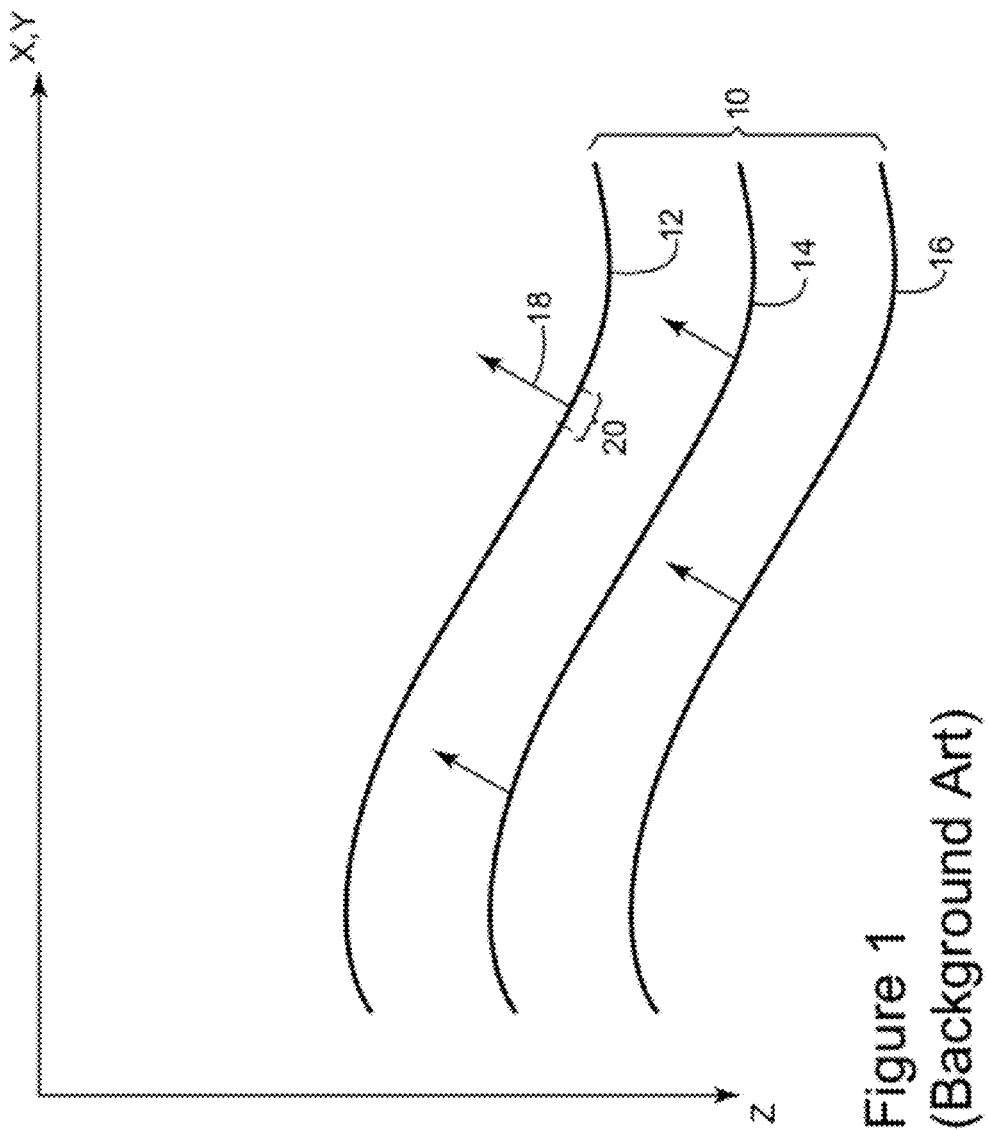
FIG. 1 is a schematic diagram of a layered structure of the earth.
Figure 2:
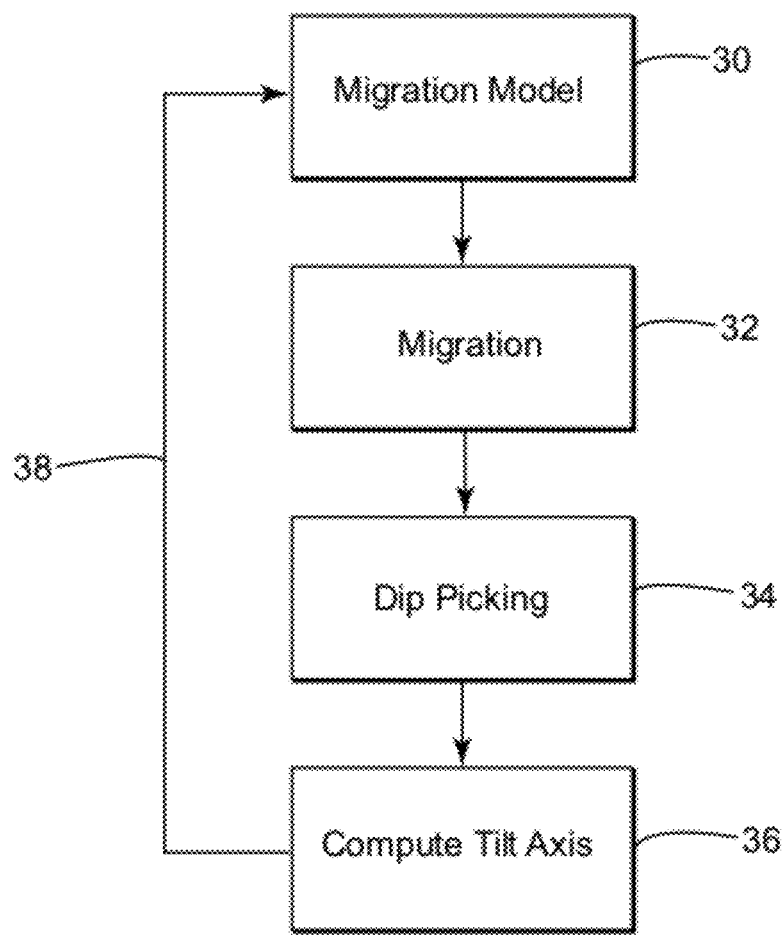
FIG. 2 is a flowchart of a method for calculating a tilt axis.

In this way, it is noted that steps 52 and 54 are not repeated as in the traditional methods illustrated in FIG. 2. There is possible to add an optional step 60 of repeating these steps 52 and 54. However, even if this optional step is added, as will be seen later, the repetition of the steps 52 and 54 in the method shown in FIG. 3 is minimal comparative with the repetition of these steps in FIG. 2.

Figure 4:
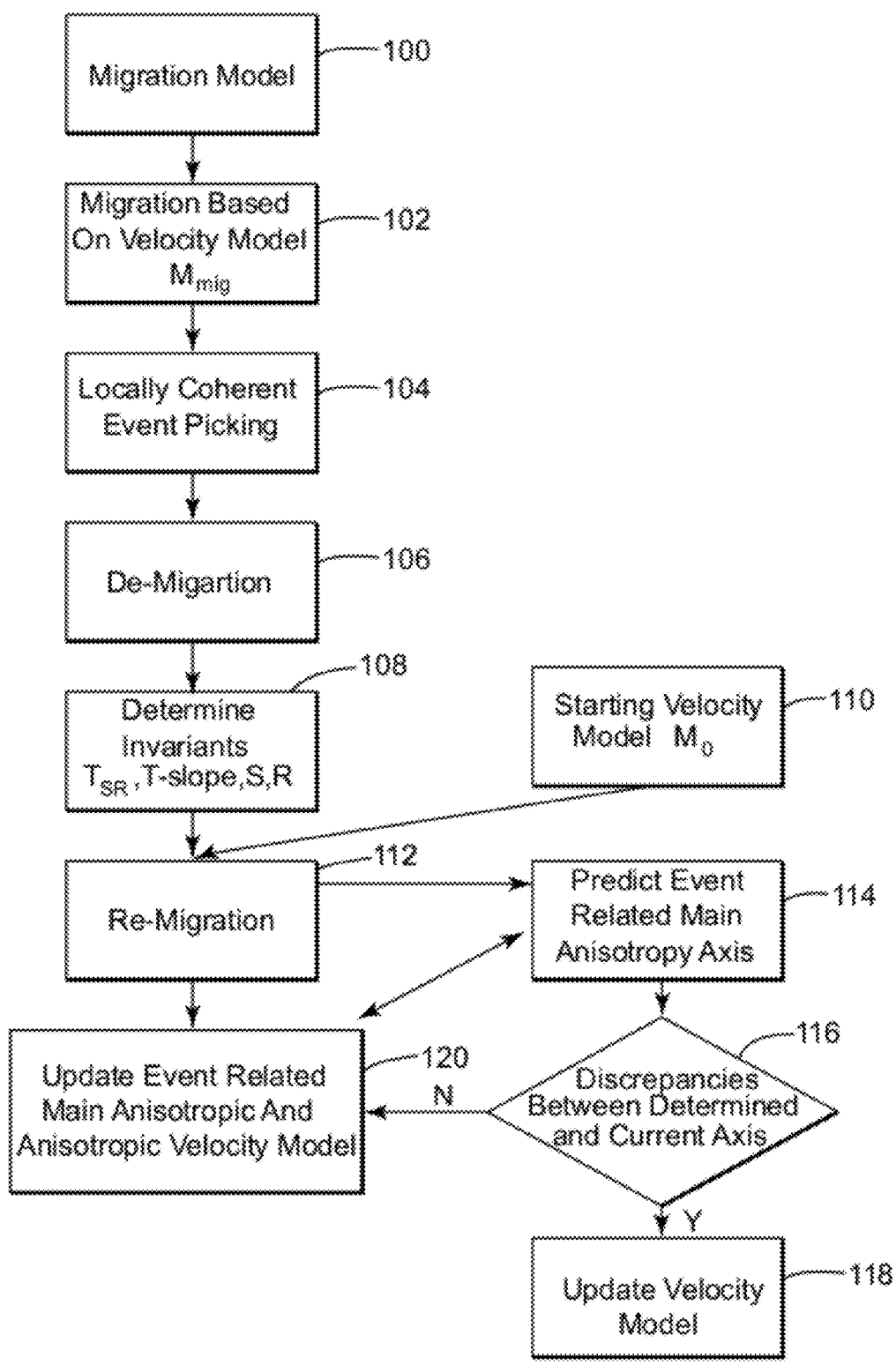
FIG. 4 is a flowchart of a method for calculating an event related main anisotropic axis of symmetry of a subsurface according to an exemplary embodiment.
Figure 5:
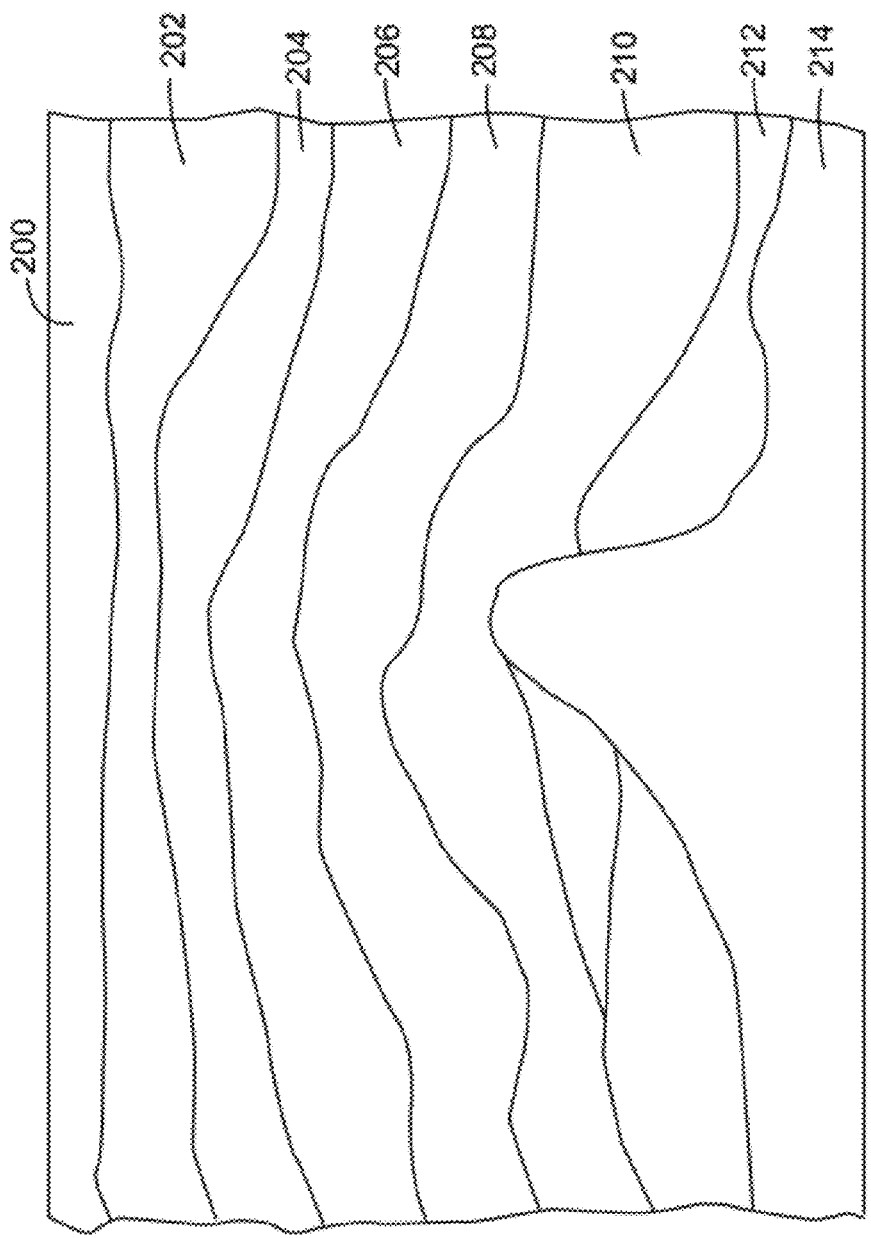
FIG. 5 is a schematic diagram of a velocity model.

According to another exemplary embodiment, a possible implementation of the method illustrated in FIG. 3 is now discussed with regard to FIG. 4. FIG. 4 shows that in step 100 that an anisotropic velocity model $M_{mig}$ is selected. A possible anisotropic velocity model $M_{mig}$ (referred to as migration velocity model) is used to migrate in depth or in time the un-migrated time domain seismic data. FIG. 5 illustrates such a velocity model in which the top surface of the earth 200 is shown together with various substrate regions (layers) 202 to 214, each region having a different velocity. For simplicity, the method shown in FIG. 4 is restricted to a depth domain case, but a time domain workflow is similar as would be recognized by those skilled in the art.

The steps discussed above and those to be discussed later are understood to be performed either by a computer, dedicated hardware, software or a combination thereof. A computer or hardware are discussed later in more detail with regard to FIG. 15.

Figure 6:
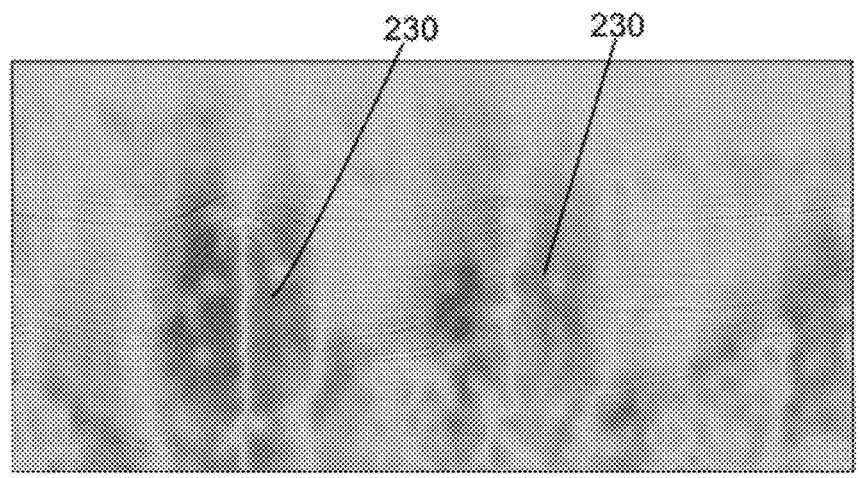
FIG. 6 is a schematic diagram an STI-related tilt axis on top of a migrated image according to an exemplary embodiment; Because red and blue colors produce equivalent grey color, I am not sure that this figure is useful. RFF: I will take care that the formal drawings distinguish these two colors somehow.
Figure 7:
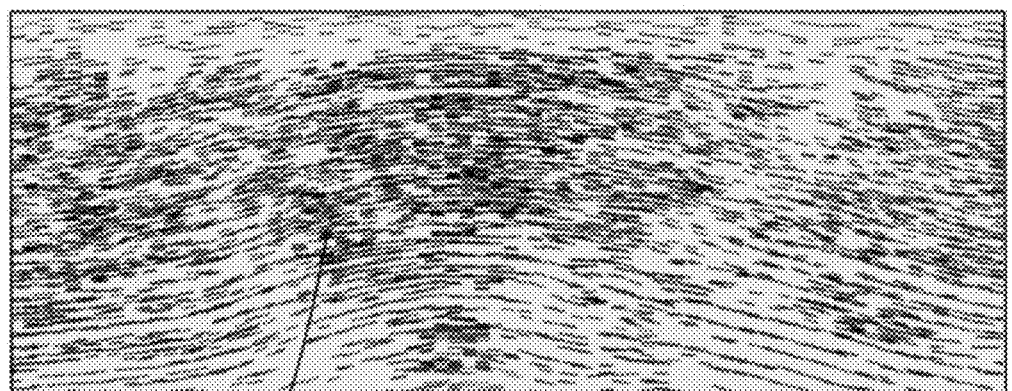
FIG. 7 is a schematic diagram of locally coherent events picked along geology according to an exemplary embodiment.

The seismic data is migrated in step 102 based on the selected velocity model $M_{mig}$. The result of the depth migration is a multi-dimensional migrated image. In step 104, the method picks locally coherent events from seismics (i) in pre-stack un-migrated time domain or (ii) in time migrated domain or (iii) in depth migrated domain. Locally coherent events are picked/measured in the migrated image as shown in FIGS. 6 and 7. FIG. 6 shows a STI-related tilt axis 230 on top of the migrated image while FIG. 7 shows plural locally coherent events 240. A locally coherent event describes an elementary piece of a geological reflecting horizon and is defined by its position in space P(x, y, z) and its structural dip possibly described by the unit vector N(nx, ny, nz), which is orthogonal to the horizon in P(px, py, pz). Locally coherent events are picked wherever possible in the migrated image.

Figure 8:
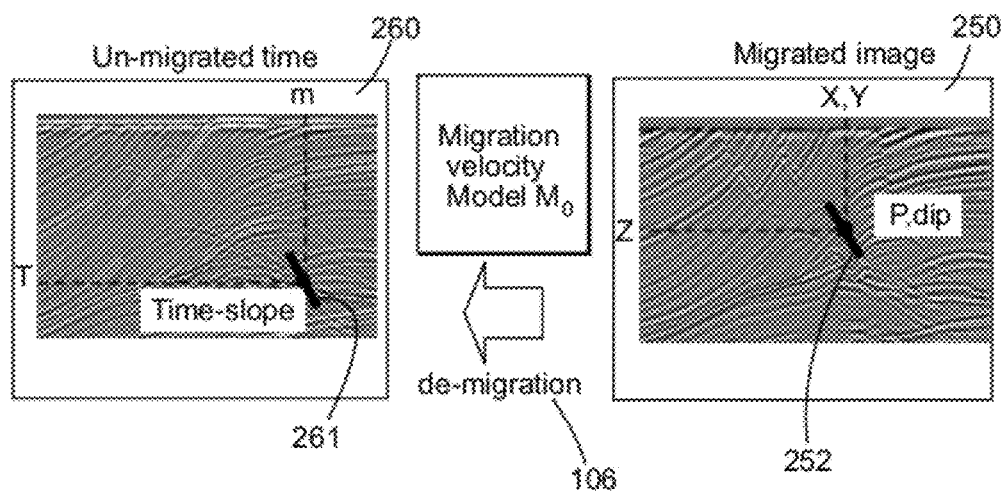
FIG. 8 is a schematic diagram of a de-migration process according to an exemplary embodiment.

If picks are performed in the migrated domain, then de-migrate in step 106 the picked events to determine in step 108 the seismic invariants (source position, receiver position, travel time, and time slope corresponding to imaging condition) that do not depend (i.e., are independent of the model) on the velocity model used to migrate the seismic data. The de-migration step 106 is illustrated in FIG. 8, with the migrated image 250 showing a facet (part of a reflector) 252 having the position P and the dip "dip." The position of the facet 252 is shown on the Cartesian axes X, Y, and Z. After applying the de-migration process 106, the facet 252 is now characterized in the un-migrated time domain 260 by a facet 261. The facet 261 is characterized by a time T, a time slope and a parameter m, which may be related to the position of the source and/or the receiver. In one application, the parameter or coordinate "m" is related to the common midpoint (CMP), i.e., the midpoint between the position of the source and the position of the receiver.

Figure 9:
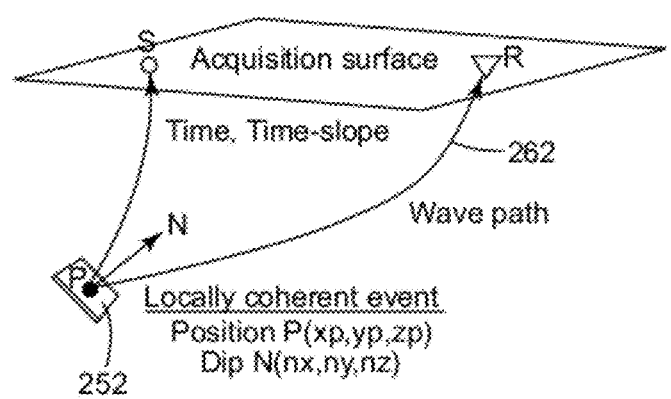
FIG. 9 is a schematic diagram of a mapping of a facet to seismic invariants according to an exemplary embodiment.

FIG. 9 shows how the process 106 takes as input the data (P and dip) related to the facet and calculates, for example, based on wave path 262, the positions of the source S, receiver R, the time and the time-slope. Each locally coherent event may be de-migrated using specular ray-tracing in the migration velocity model $M_{mig}$, where specularity depends on the imaging condition. The de-migrated quantities S, R, time and time-slope are the invariants, so called as they are quantities that could have been observed directly in the un-migrated time domain.

In step 110, a starting anisotropic velocity model $M_0$ is build. It is noted that this model may be the $M_{mig}$ selected in step 100. However, other models may be used as the invariants in step 108 do not depend on any model. Based on the invariants of step 108 and the starting model $M_0$, the process enters now in a loop that includes steps 112, 114, 116, 118 and 120. Calculations performed in this loop are non-linear and they result in updating the velocity model in step 118 as discussed next. For example, the method may perform a tomographic inversion that perturbs an initial event-related tilt axis till a discrepancy between an axis inferred from the dip of the migrated event and the event-related tilt axis at the position of the migrated event is globally minimized. As invariants are used for these calculations, the initial event-related tilt needs not be close to the solution tilt axis and may simply be, for example, the VTI case. The problem to solve is non-linear and ill-posed, hence a non-linear tomography method is used. It is noted that steps 102 and 104 are not looped in this exemplary embodiment, which reduces the needed amount of processor power in comparison to the traditional methods.

Figure 10:
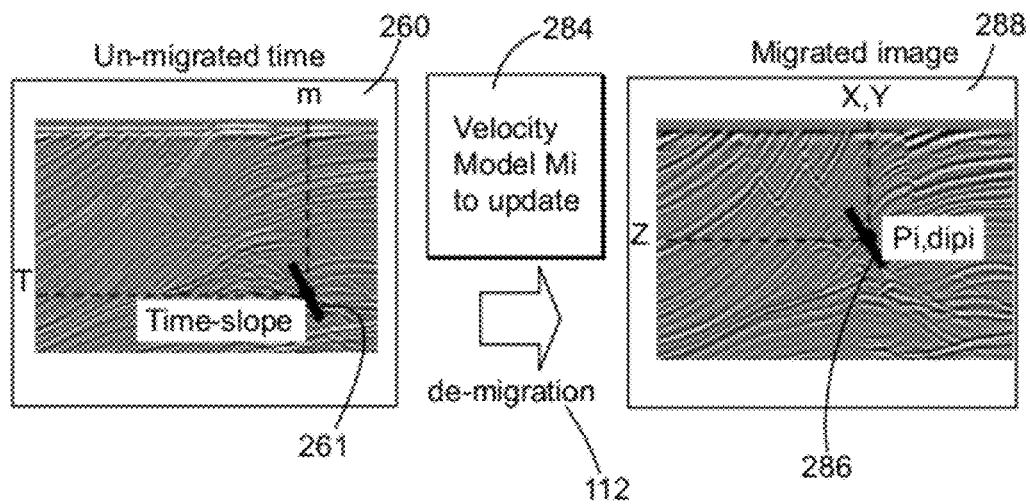
FIG. 10 is a schematic diagram of a re-migration process according to an exemplary embodiment.
Figure 11:
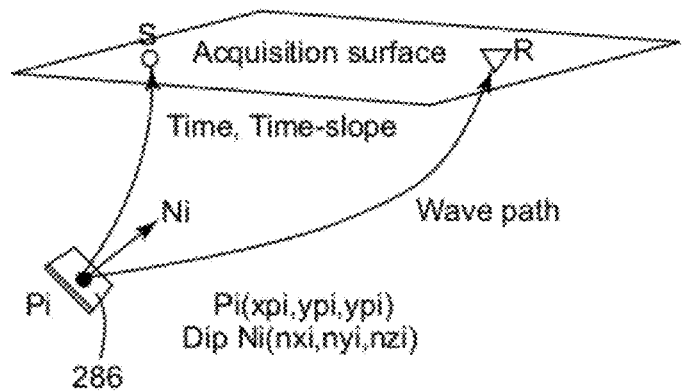
FIG. 11 is a schematic diagram of a mapping of seismic invariant to a new facet according to an exemplary embodiment.

At the $i^{th}$ iteration, the loop starts with step 112 in which the invariants are re-migrated to obtain a new facet having a new position $P_i$ and a new dip $dip_i$. This step is illustrated in FIGS. 10 and 11. FIG. 10 shows the un-migrated data 260 including a facet 261 having coordinates m and T similar to the data shown in FIG. 8. The facet is migrated in step 112, based on the velocity model $M_i$ 284, to the migrated facet 286 as shown in the migrated image 288, having the coordinates $P_i$ and $dip_i$. The same idea is illustrated in FIG. 11, in which it is shown how the invariants S, R, time and time-slope are used to re-migrate the seismic data to the new facet 286. This process may be applied to part or all facets of the subsoil in a predetermined volume.

Figure 12:
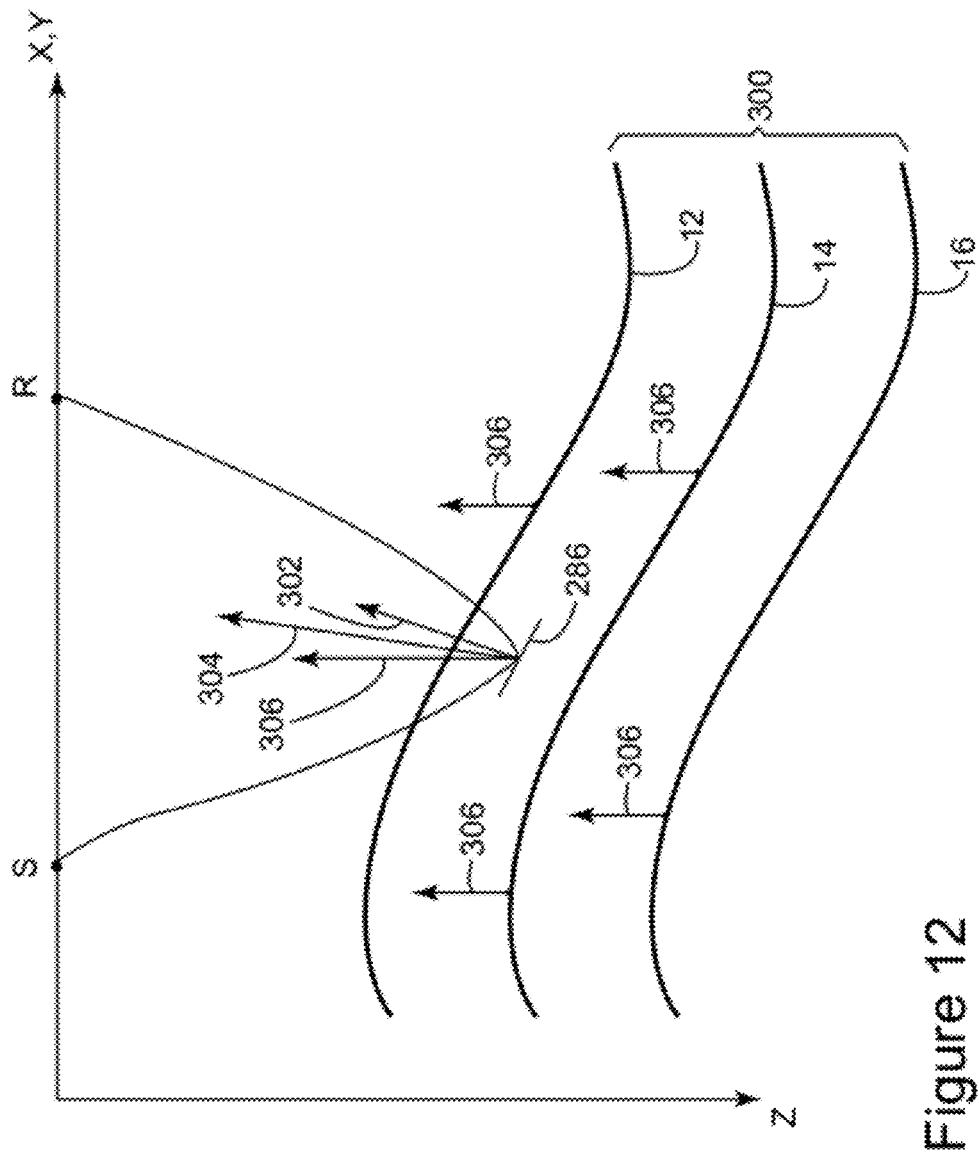
FIG. 12 is a schematic diagram illustrating calculated, predicted and current tilt axes of a subsurface according to an exemplary embodiment.

In step 114 (see FIG. 4), the event-related main anisotropy axis is predicted. For a better understanding of the event-related main anisotropy axis, FIG. 12 shows a subsoil structure 300 and various axes associated with this structure. The calculations performed in step 112 have associated the facet 286 with dip 302 (perpendicular to the facet) when migrated with the current event-related main isotropy axis 306. The predicted event-related main anisotropy axis 304 may be different from the current event-related main anisotropy axis 306, as shown in FIG. 12. The current event-related main anisotropy axis 306 may be part of the initial velocity model $M_0$. The predicted event-related main anisotropy axis 304 is computed based on the migrated facet dip 302 and on the subsoil structure-related knowledge (e.g., how old are the layers in the subsoil structure, what is their composition, etc.)

Discrepancies (e.g., differences) between the current event-related main anisotropy axis 306 and the predicted event-related main anisotropy axis 304 are computed in step 116. If the differences are small, e.g., below a predetermined threshold, the possibly updated velocity model $M_i$ is output in step 118 (i.e., the current axis 306 is considered to be equal to the calculated axis 304) and the process is terminated. However, if the differences are not below the threshold, the process continues to step 120, in which the current event-related main anisotropy axis 306 (used by the model) is updated, e.g., the value of the axis 306 is perturbed (through a linear solver) to reflect the computed value of the axis 304 and the loop continues to step 112 and so on until the predicted axis 304 is close enough to the current axis 306.

In this way, the steps 102 and 104 in FIG. 4 are not recalculated as they are not part of the loop, which provides an advantage over the traditional methods as these steps 102 and 104 are computer intensive. It is also noted that the loop 112, 114, 116 and 120 is non-linear as an inverse problem is solved, as discussed next.

As discussed above, each iteration of the loop includes a forward modeling step and an inverse modeling step. The forward modeling step is typically the non-linear component in the loop and is performed in steps 112 and 114 while the inverse modeling step is performed in step 120. At the end of each iteration (in step 120), the event-related main anisotropy axis and/or the event-related main anisotropy axis related model (which is part of the velocity model) are updated before starting a next iteration. More specifically, in the forward modeling step each invariant (from step 108 in FIG. 4) is re-migrated (step 112) in an updated velocity model. In the inverse modeling step, the discrepancy between the predicted event-related main anisotropy axis and the current event-related main anisotropy axis is calculated, and may be used, for example, in a least-squares sense, to define a cost function of the linearized system to solve. An event-related main anisotropy tilt perturbation $\Delta T_i$ may be computed by solving a linear system built from discrepancy measurements from all of the re-migrated invariants. A resultant tilt $T_{i+1}=T_i+\Delta T_i$ is inserted into the velocity model $M_{i+1}$ and the loop is recalculated for determining a new tilt axis. The iterative process stops when the cost function has reached a minimum in step 116. A multi-grid approach can be implemented for helping avoid one or more local minima of the cost function.

Figure 13:
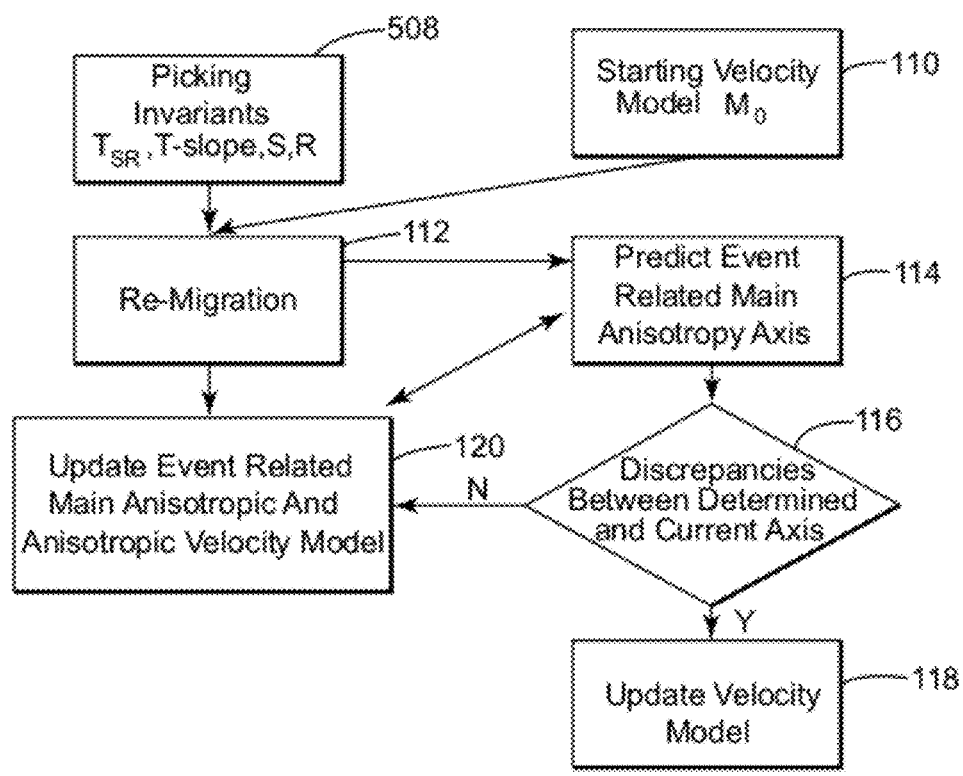
FIG. 13 is a flowchart of a method for determining a tilt axis according to an exemplary embodiment.

According to another exemplary embodiment, the method discussed with reference to FIG. 4 may be modified to be applicable to a case in which the seismic is not migrated as shown in step 102 of FIG. 4. In other words, the seismic data is presented in an un-migrated domain and the invariants $T_{SR}$, T-slope, S and R are picked directly from the this un-migrated domain. FIG. 13 shows such step 508 followed by the steps 110, 112, 114, 116, 118 and 120 of FIG. 4. Thus, the process illustrated in FIG. 13 can be applied to seismic data that was not migrated.

Figure 14:
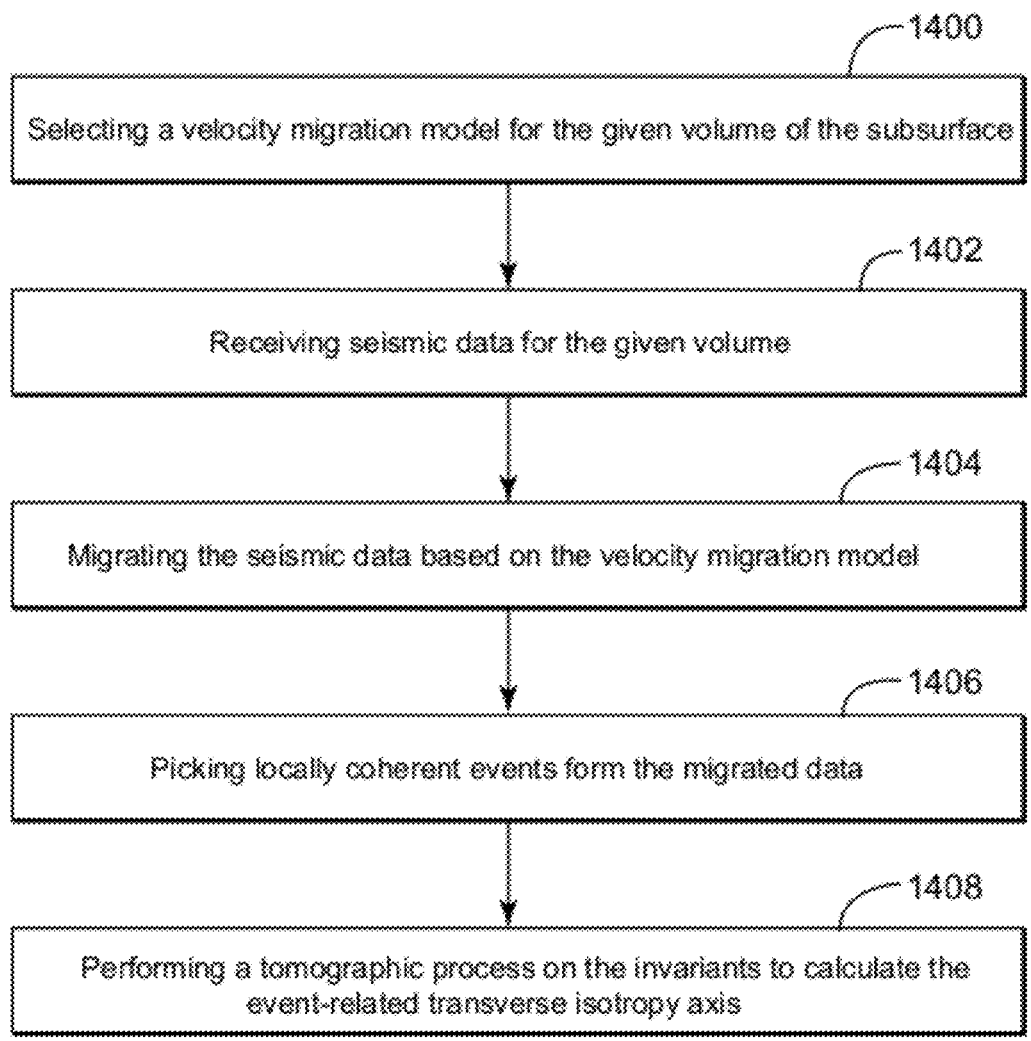
FIG. 14 is a schematic diagram of a device in which the method of FIG. 13 may be implemented according to an exemplary embodiment.

According to an exemplary embodiment illustrated in FIG. 14, there is a method for estimating an event-related main anisotropy axis for a volume in a subsurface. The method includes a step 1400 of selecting a velocity migration model for the given volume of the subsurface; a step 1402 of receiving seismic data for the given volume; a step 1404 of migrating the seismic data based on the velocity migration model; a step 1406 of picking locally coherent events from the migrated data; and a step 1408 of performing a tomographic process on the invariants to calculate the event-related main anisotropy axis.

It is noted that according to an exemplary embodiment, the proposed method is one pass (for the migration and picking) and may not even require an initial migration when events are picked in un-migrated time domain. The method described in one or more of the exemplary embodiments maximizes the structural coherency between the migration velocity model and the migrated image, which is not ensured by the conventional iterative approach.

The methods discussed above may be implemented in dedicated devices (e.g., dedicated networks or computers or cloud computing networks, etc.) for being performed. A combination of software and hardware may be used to achieve the event-related transversal isotropic axis and/or an associated tilt model. A dedicated machine that can implement one or more of the above discussed exemplary embodiments is now discussed with reference to FIG. 15.

An exemplary computing arrangement 1500 suitable for performing the activities described in the exemplary embodiments may include server 1501. Such a server 1501 may include a central processor (CPU) 1502 coupled to a random access memory (RAM) 1504 and to a read-only memory (ROM) 1506. The ROM 1506 may also be other types of storage media to store programs, such as programmable ROM (PROM), erasable PROM (EPROM), etc. The processor 1502 may communicate with other internal and external components through input/output (I/O) circuitry 1508 and bussing 1510, to provide control signals and the like. The processor 1502 carries out a variety of functions as is known in the art, as dictated by software and/or firmware instructions.

The server 1501 may also include one or more data storage devices, including hard and floppy disk drives 1512, CD-ROM drives 1514, and other hardware capable of reading and/or storing information such as DVD, etc. In one embodiment, software for carrying out the above discussed steps may be stored and distributed on a CD-ROM 1516, diskette 1518 or other form of media capable of portably storing information. These storage media may be inserted into, and read by, devices such as the CD-ROM drive 1514, the disk drive 1512, etc. The server 1501 may be coupled to a display 1520, which may be any type of known display or presentation screen, such as LCD displays, plasma display, cathode ray tubes (CRT), etc. A user input interface 1522 is provided, including one or more user interface mechanisms such as a mouse, keyboard, microphone, touch pad, touch screen, voice-recognition system, etc.

The server 1501 may be coupled to other computing devices, such as the landline and/or wireless terminals and associated watcher applications, via a network. The server may be part of a larger network configuration as in a global area network (GAN) such as the Internet 1528, which allows ultimate connection to the various landline and/or mobile client/watcher devices.

As also will be appreciated by one skilled in the art, the exemplary embodiments may be embodied in a wireless communication device, a computer network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Figure 15:
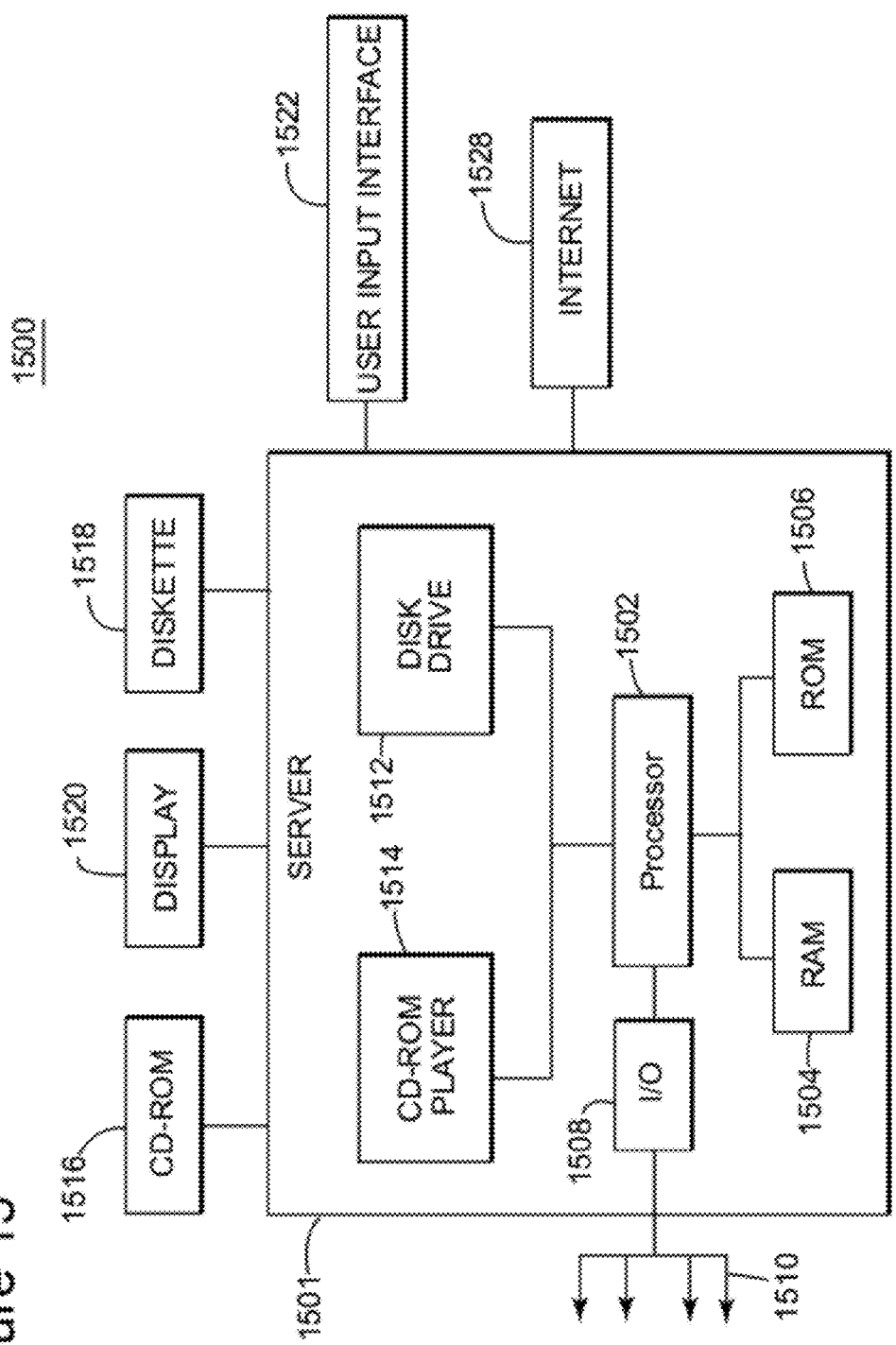
FIG. 15 is a schematic diagram of various blocks that are configured to perform the steps of the method for determining the tilt axis according to an exemplary embodiment.
Figure 16:
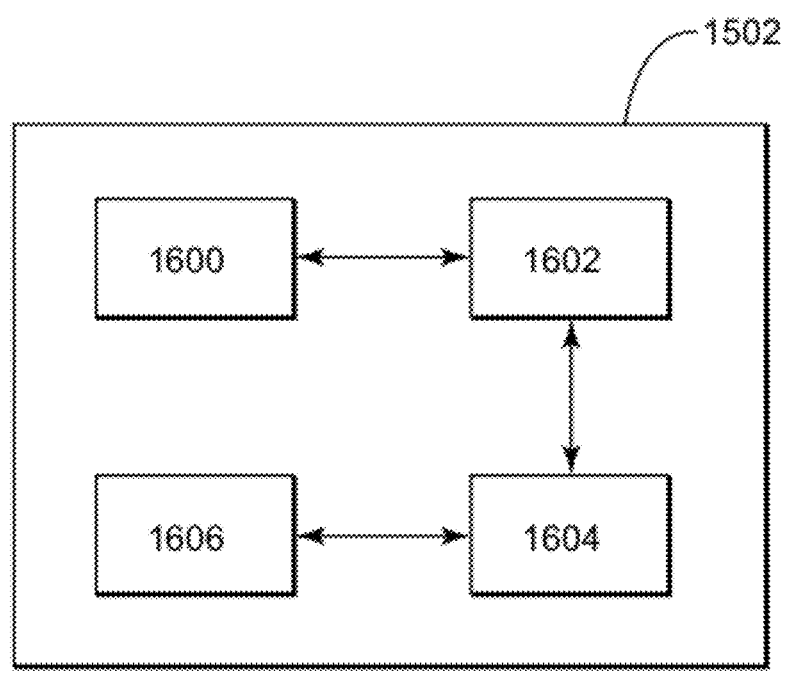
FIG. 16 is a schematic diagram of a processor that includes logical blocks for performing the steps of the method of FIG. 14.

Further, the steps described in FIG. 15 may be implemented in the processor 1502 so that, as shown in FIG. 16, a block 1600 is configured to perform steps 112 and 114, a block 1602 is configured to perform step 116 and a block 1604 is configured to perform step 120. The remaining steps may be performed either by a block 1606 or by the block 1602. A computer interface may be implemented in a computer system to provide the capabilities shown in FIG. 14. In one exemplary embodiment, the computer interface may include the block 1600 of FIG. 15 and its functionalities.

The disclosed exemplary embodiments provide a system and a method for estimating an event-related main anisotropy axis and/or corresponding model. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for estimating event-related main anisotropy axis for a volume in a subsurface, the method comprising:
   selecting a velocity migration model for the given volume of the subsurface;
   receiving seismic data for the given volume;
   migrating the seismic data based on the velocity migration model;
   picking locally coherent events from the migrated data, each locally coherent event describing a facet that is an elementary piece of a geological reflecting horizon in the subsurface and comprising a position and a facet dip perpendicular to the facet at the position; and
   performing a tomographic process using invariants from the locally coherent events and a predicted event-related main anisotropy axis based on the facet dip to calculate the event-related main anisotropy axis.

2. The method of claim 1, wherein the step of performing a tomographic process is non-linear.

3. The method of claim 1, further comprising:
   determining the invariants associated with the seismic data by de-migrating the migrated data.

4. The method of claim 3, further comprising:
   using a starting velocity model and the invariants for the step of performing the tomographic process.

5. The method of claim 4, wherein the starting velocity model is identical to the velocity migration model.

6. The method of claim 4, wherein the step of performing a tomographic process further comprises:
   applying a forward modeling step to the invariants; and
   applying an inverse modeling step for updating a current event-related main anisotropy axis, wherein the current event-related main anisotropy axis is part of the starting or current velocity model.

7. The method of claim 6, wherein the step of applying a forward modeling step comprises:
   re-migrating the invariants to determine a migrated position and a migrated dip for each facet; and
   using the migrated position and the migrated dip to create the predicted event-related main anisotropy axis associated with each facet.

8. The method of claim 7, further comprising:
   comparing the current event-related main anisotropy axis with the predicted event-related main anisotropy axis.

9. The method of claim 8, further comprising:
   updating the current event-related main anisotropy axis with a value of the predicted event-related main anisotropy axis if a difference between the current and predicted event-related main anisotropy axes is above the given threshold.

10. The method of claim 9, further comprising:
    repeating the steps of re-migrating, predicting and updating until a cost function reaches a minimum.

11. The method of claim 10, wherein the cost function is determined by using a tilt perturbation approach on an initial or current velocity model and solving a linear system built from discrepancy measurements for the re-migrated invariants.

12. An interface implemented in a computer system for estimating event-related transverse isotropy axis for a volume in a subsurface, the interface being configured to execute the following steps:
    selecting a velocity migration model for the given volume of the subsurface;
    receiving seismic data for the given volume;
    migrating the seismic data based on the velocity migration model;
    picking locally coherent events from the migrated data, each locally coherent event describing a facet that is an elementary piece of a geological reflecting horizon in the subsurface and comprising a position and a facet dip perpendicular to the facet at the position; and
    performing a tomographic process using invariants from the locally coherent events and a predicted event-related main anisotropy axis based on the facet dip to calculate the event-related main anisotropy axis.

13. The interface of claim 12, wherein the step of performing a tomographic process is non-linear.

14. The interface of claim 12, further comprising:
    determining the invariants associated with the seismic data by de-migrating the migrated data.

15. The interface of claim 14, further comprising:
    using a starting velocity model and the invariants for the step of performing the tomographic process.

16. The interface of claim 15, wherein the starting velocity model is identical to the velocity migration model.

17. The interface of claim 15, wherein the step of performing a tomographic process further comprises:
    applying a forward modeling step to the invariants; and
    applying an inverse modeling step for updating a current model event-related main anisotropy axis, wherein the current event-related main anisotropy axis is part of the starting or current velocity model.

18. The interface of claim 17, wherein the step of applying a forward modeling step comprises:
    re-migrating the invariants to determine a migrated position and a migrated dip for each facet; and
    using the migrated position and the migrated dip to create the predicted event-related main anisotropy axis associated with each facet.

19. A computer system configured to estimate an event-related main anisotropy axis for a volume in a subsurface, the computer system comprising:
    an interface configured to receive and output data; and
    a processor connected to the interface and configured to, select a velocity migration model for the given volume of the subsurface, receive seismic data for the given volume, migrate the seismic data based on the velocity migration model, pick locally coherent events from the migrated data, each locally coherent event describing a facet that is an elementary piece of a geological reflecting horizon in the subsurface and comprising a position and a facet dip perpendicular to the facet at the position, and perform a tomographic process using invariants from the locally coherent events and a predicted event-related main anisotropy axis based on the facet dip to calculate the event-related main anisotropy axis.

20. A computer readable medium including computer executable instructions, wherein the instructions, when executed, implement a method for estimating an event-related main anisotropy axis for a volume in a subsurface, the method comprising:

selecting a velocity migration model for the given volume of the subsurface;

receiving seismic data for the given volume;

migrating the seismic data based on the velocity migration model;

picking locally coherent events from the migrated data, each locally coherent event describing a facet that is an elementary piece of a geological reflecting horizon in the subsurface and comprising a position and a facet dip perpendicular to the facet at the position; and performing a tomographic process using invariants from the locally coherent events and a predicted event-related main anisotropy axis based on the facet dip to calculate the event-related main anisotropy axis.

21. A method for estimating event-related main anisotropy axis for a volume in a subsurface, the method comprising:

receiving at a processor seismic data for the given volume;

picking invariants from the seismic data, wherein the seismic data is not migrated; and performing a tomographic process based using the invariants from the seismic data and a predicted event-related main anisotropy axis for the volume in the subsurface to calculate the event-related main anisotropy axis.

* * * * *